Patented Sept. 26, 1922.

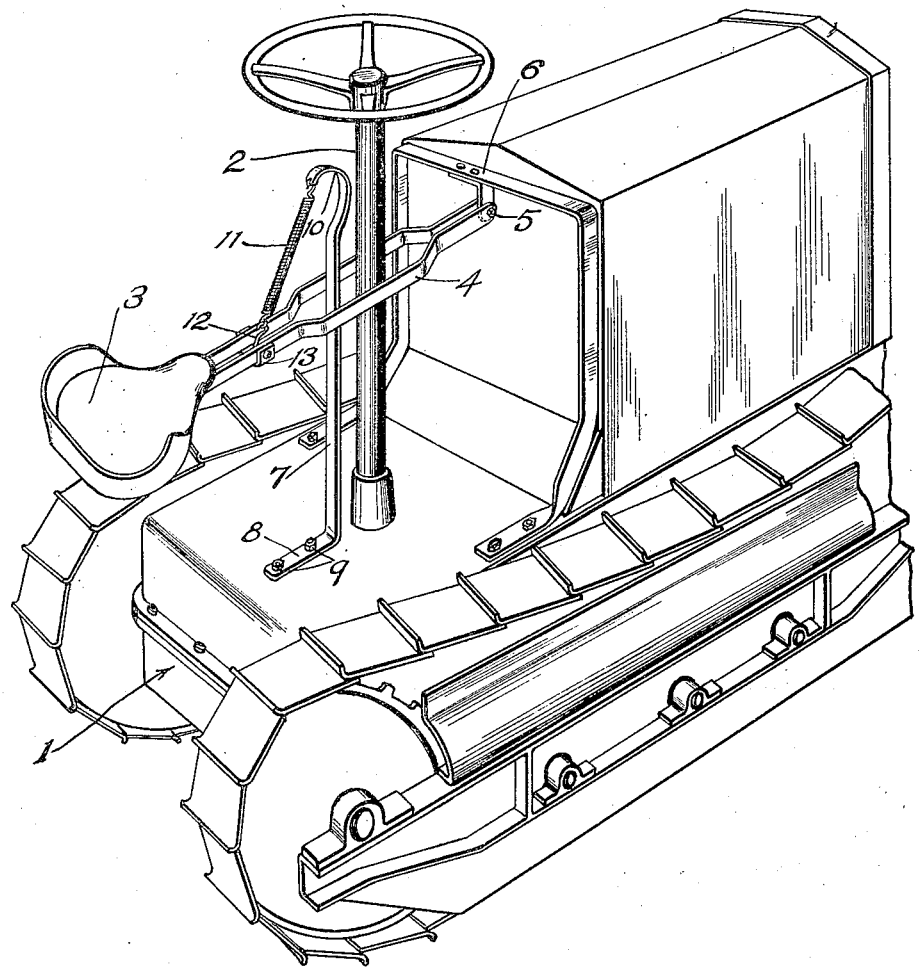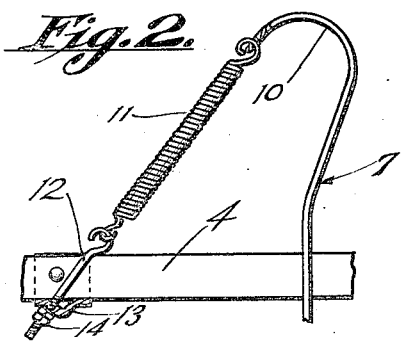

1,430,495

UNITED STATES PATENT OFFICE.

SAMUEL J. COUGHRAN, OF BUENA PARK, CALIFORNIA.

DUAL SPRING SUSPENSION

Application filed August 25, 1920. Serial No. 405,945.

*To all whom it may concern:*

Be it known that I, SAMUEL J. COUGHRAN, a citizen of the United States, residing at Buena Park, in the county of Orange and State of California, have invented new and useful Improvements in Dual Spring Suspensions, of which the following is a specification.

This invention relates to a dual spring suspension for the seat of a tractor or the like.

It is the object of the invention to provide a seat suspension whereby the resiliency of the support for the seat is obtained initially by a leaf spring, and auxiliary resilient supporting means is also provided by a coil spring.

The invention will be readily understood from the following description of the accompanying drawing, in which Figure 1 is a view of a tractor having the seat suspending means.

Fig. 2 is a detail side elevation of the connection with the seat.

I have shown the improved seat suspension employed in connection with a tractor shown generally at 1 and having the steering post 2. The seat 3 is fixed upon a bar 4 extending from the same and pivoted at 5 to a portion 6 of the engine frame. The suspending bar 4 preferably consists of spaced side members arranged to be received at opposite sides of the steering post.

A leaf spring 7 is mounted in an upright position upon the base of the tractor by means of an angularly disposed lower end 8 of said spring bolted to the tractor as shown at 9. This spring extends upwardly between the spaced members forming bar 4, in rear of steering post 2, and is provided at its upper end with a curved portion 10.

This upper end of leaf spring 7 is above the suspending bar 4 and is connected thereto at a point in rear of leaf spring 7. This connection is an auxiliary resilient connection consisting of a coil spring 11 having one end connected to the end 10 of leaf spring 7 and having its opposite end connected to bar 4. As an instance of this arrangement said opposite end of spring 11 may be secured to a hook 12 which extends through bracket 13 carried by bar 4. A nut 14 is threaded upon the end of the hook for adjusting the relation thereof to bracket 13. By this arrangement the tension of spring 11 may be adjusted.

The tension of springs 7 and 11 are so arranged that spring 11 will not normally yield when there is a weight upon seat 3, the spring 7 yielding to provide the resilient suspension for said seat. When however, the seat is subjected to severe shock the spring 11 will also yield to provide an additional resilient support for the same.

It will be apparent that various changes may be made in the construction as thus set forth without departing from the spirit of the invention.

What is claimed is:

The combination with a horizontally disposed pivotally mounted seat supporting bar formed in two parts, of a resilient upright member positioned between the parts of said seat supporting bar, the lower end of which resilient upright member is fixed on a suitable support, a retractile spring arranged between the upper end of said resilient member and said seat supporting bar.

In testimony whereof I have signed my name to this specification.

SAMUEL J. COUGHRAN.